US010679815B1

(12) United States Patent
Lynch (10) Patent No.: US 10,679,815 B1
(45) Date of Patent: Jun. 9, 2020

(54) FUSE CUTOUT COVER WITH WIDE ANGLE OPENING FOR LOADBREAK TOOL (71) Applicant: Eco Electrical Systems, Reno, NV (US)

(72) Inventor: Michael Lynch, Reno, NV (US)

(73) Assignee: Eco Electrical Systems, Reno, NV (US)

(*) Notice: Subject to any disclaimer, the term of this patent is extended or adjusted under 35 U.S.C. 154(b) by 0 days.

(21) Appl. No.: 16/214,517

(22) Filed: Dec. 10, 2018

(51) Int. Cl.
H01H 85/18 (2006.01)
H02B 1/06 (2006.01)
H01H 31/00 (2006.01)

(52) U.S. Cl.
CPC ........ *H01H 85/185* (2013.01); *H01H 31/006* (2013.01); *H02B 1/06* (2013.01)

(58) Field of Classification Search
CPC .. H01H 85/185; H01H 31/006; H01H 21/165; H01H 31/122; H01H 31/127; H02B 1/06
USPC .................. 337/168, 171, 202, 403
See application file for complete search history.

(56) References Cited

U.S. PATENT DOCUMENTS 2,263,319 A * 11/1941 Treanor ................ H01B 17/26
174/139
4,540,968 A * 9/1985 Kato ...................... H01H 85/44
337/1
4,870,387 A * 9/1989 Harmon ................ H01B 17/42
337/168
5,191,311 A * 3/1993 Webb ..................... H01H 31/125
337/168
5,300,912 A * 4/1994 Tillery ................ H01H 31/127
174/179
6,963,025 B1 * 11/2005 Kysely ................... H01B 17/00
174/138 F
7,154,034 B2 12/2006 Lynch
7,297,869 B2 * 11/2007 Hiller ..................... H01B 17/00
119/174
8,772,633 B2 * 7/2014 Behnken ................ H01B 19/00
174/138 F
9,413,153 B2 * 8/2016 Spencer .................. H01F 27/02
9,721,703 B2 * 8/2017 Hiller ..................... H01B 17/00
9,741,476 B2 * 8/2017 Hiller ..................... H01B 17/00
9,916,956 B1 * 3/2018 Rauckman ............. H01H 85/25
(Continued)

OTHER PUBLICATIONS

Hubbell Power Systems, "CC101/CC170 One Piece Wildlife Protector," Hubbel Power Systems Product Sheet, Aug. 2012.

Primary Examiner — Jayprakash N Gandhi
Assistant Examiner — Stephen S Sul
(74) Attorney, Agent, or Firm — Patent Law Group; Brian D. Ogonowsky (57) ABSTRACT A fuse cutout cover is disclosed that allows a lineman to engage a metal hook assembly and pull ring of the cutout with a loadbreak tool at a wide range of angles, while the cover still prevents electrocution of wildlife. A first portion of the cover has a vertical opening for receiving the wire. A second portion has a substantially flat roof portion that covers the top portion of the fuse, the hook assembly, and the pull ring. The hook assembly and pull ring are laterally exposed by the cover to allow the loadbreak tool to engage the hook assembly and pull ring at a wide range of angles. Another feature of the cover is multiple sets of through-holes for securing pins so that the pin locations can be optimized for ceramic insulators and narrower polymer insulators.

17 Claims, 9 Drawing Sheets (56) References Cited

U.S. PATENT DOCUMENTS

| | | | | |
|---|---|---|---|---|
| 2008/0128163 A1* | 6/2008 | Bradford | ................ | H01B 17/00 |
| | | | | 174/5 R |
| 2013/0264097 A1* | 10/2013 | Lynch | ...................... | H02G 7/05 |
| | | | | 174/168 |
| 2015/0068798 A1* | 3/2015 | Niles | ........................ | H02G 7/00 |
| | | | | 174/5 R |
| 2016/0111863 A1* | 4/2016 | Williams | ................. | H02G 7/00 |
| | | | | 174/40 R |

\* cited by examiner

FUSE CUTOUT COVER WITH WIDE ANGLE OPENING FOR LOADBREAK TOOL

FIELD OF THE INVENTION

The invention relates to a dielectric cover for a high voltage fuse cutout. The cutout cover allows a conventional loadbreak tool to be attached to the cutout over a wide range of angles.

BACKGROUND

Applicant's own U.S. Pat. No. 7,154,034, incorporated herein by reference, describes a dielectric cutout cover. The cover protects birds and other animals from electrocution, which may also trigger an over-current condition that causes a power outage.

Figure 1:
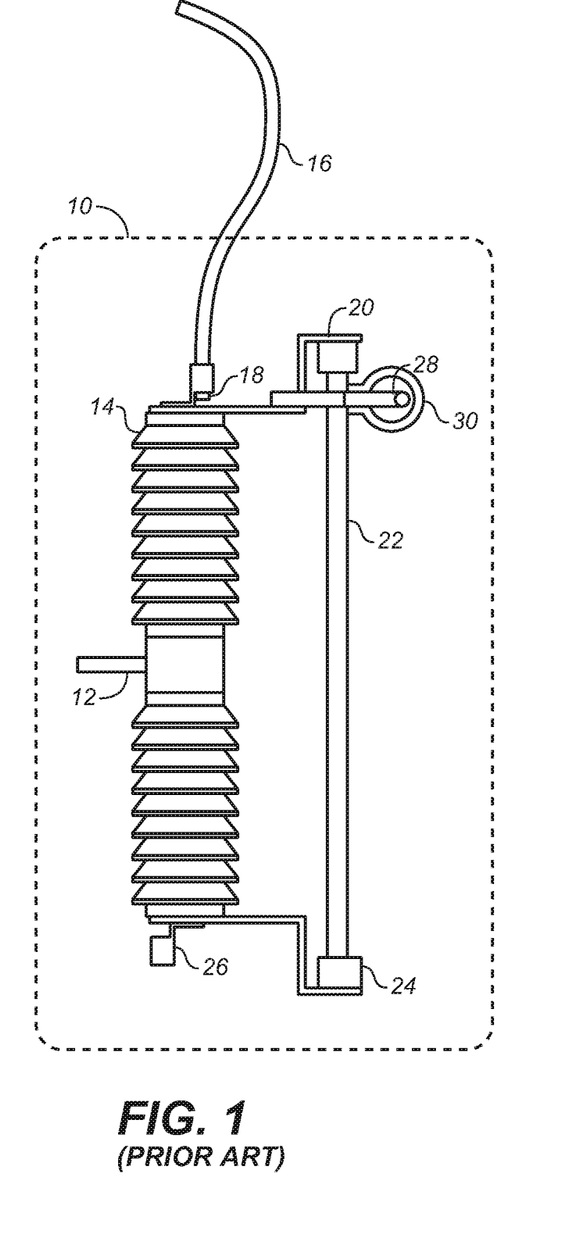
FIG. 1 is a side view of a conventional fuse cutout disclosed in Applicant's U.S. Pat. No. 7,154,034.
Figure 3:
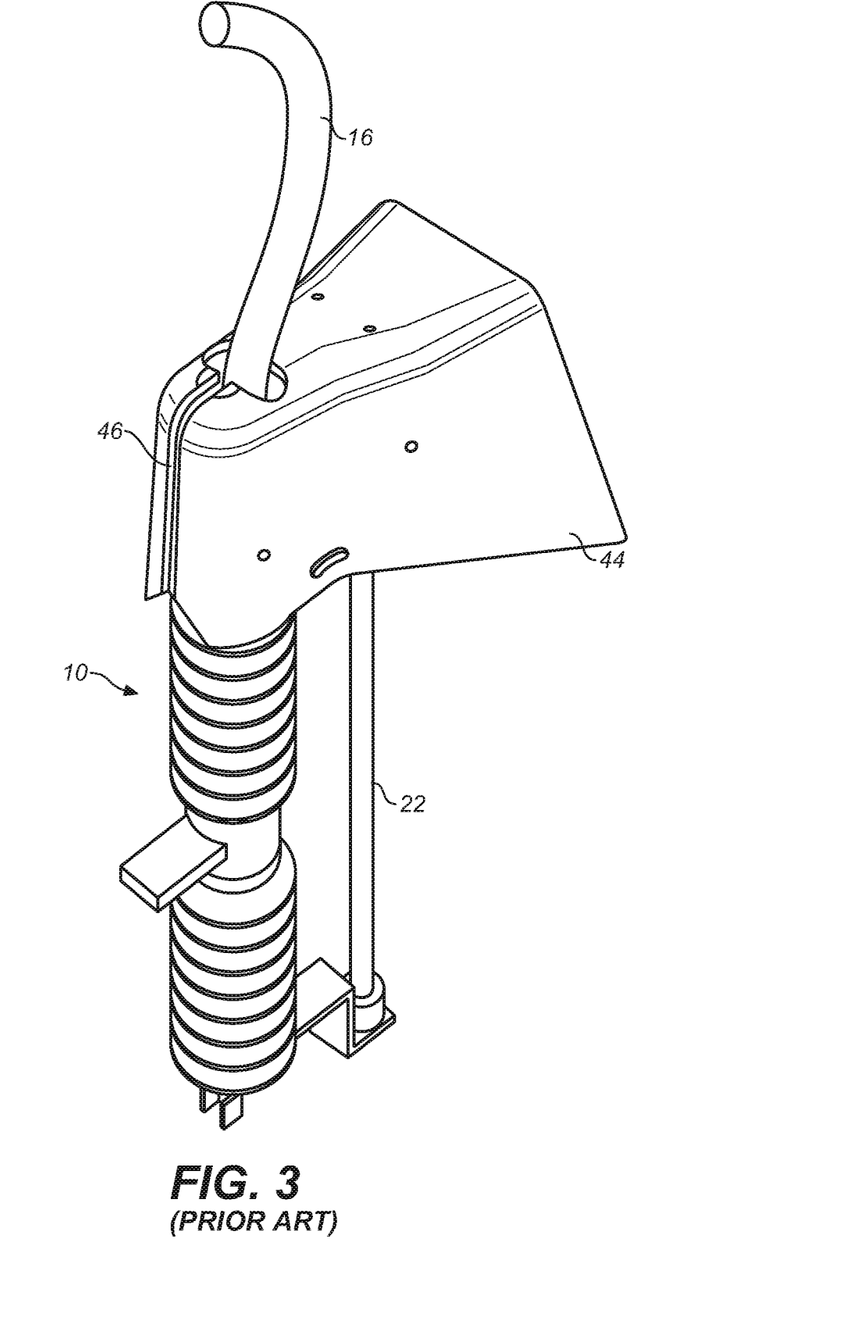
FIG. 3 is a perspective view of the cutout of FIG. 1 with a prior art cover, disclosed in Applicant's U.S. Pat. No. 7,154,034.
Figure 4:
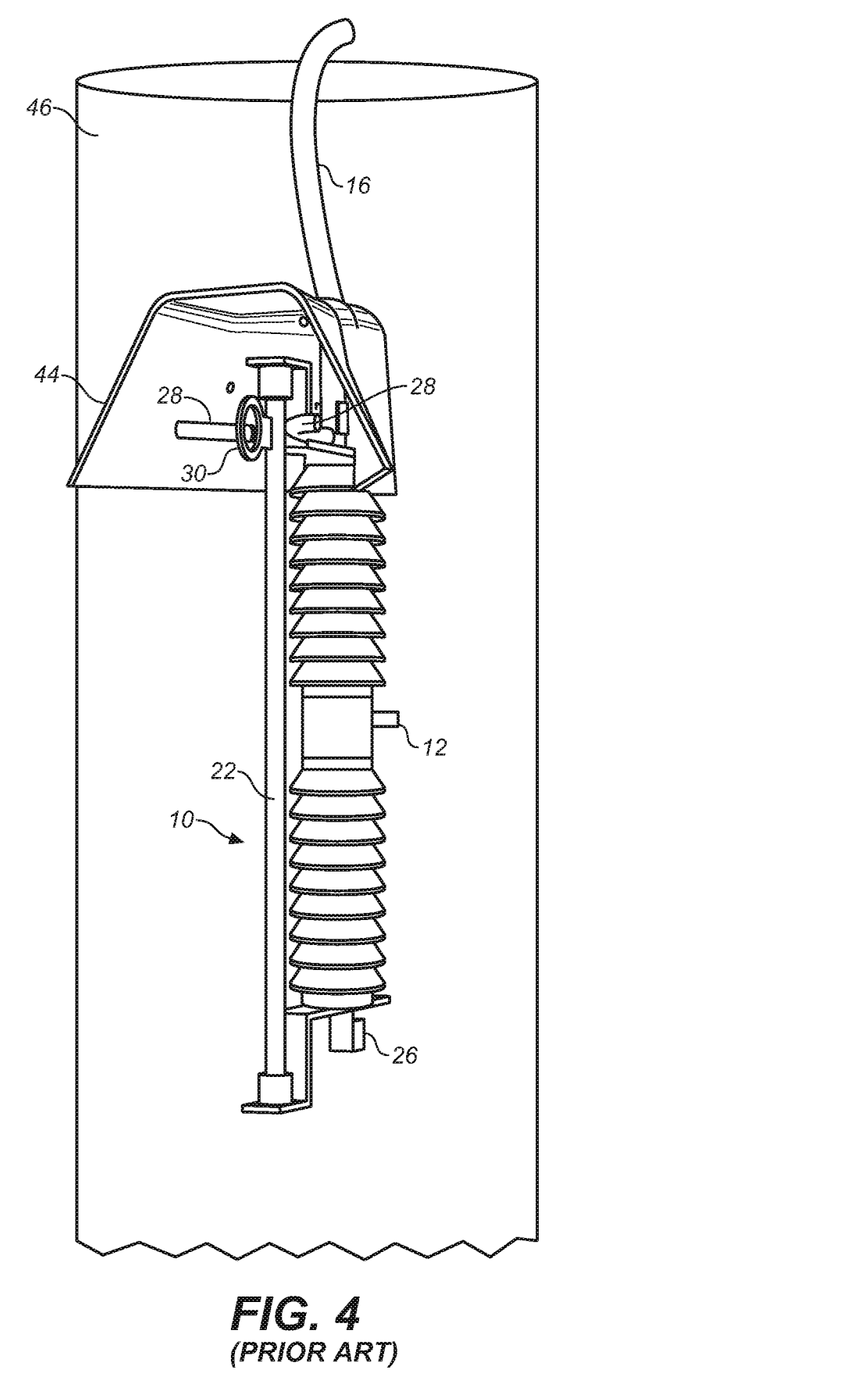
FIG. 4 is a different perspective view of the structure of FIG. 3.

FIGS. 1, 3, and 4 are reproduced from U.S. Pat. No. 7,154,034 and are used to illustrate a problem that has been reported by linemen in the field when opening the fuses using a loadbreak tool.

FIG. 1 illustrates a conventional fuse cutout 10. A mounting bracket 12 secures a ceramic or polymer insulator 14 to a wooden utility pole or cross-arm used to support high voltage conductors, such as carrying 3-phase 12KVAC or higher. A "hot" wire 16 is attached to one phase. A metal connector 18 electrically connects to the wire 16 to a top contact 20 of a blowable fuse 22. The fuse 22 electrically connects to a pivot joint 24 and a bottom connector 26. The bottom connector 26 is connected to another wire (not shown) which may lead to a transformer or any other electrical device or conductor. Opening or blowing of the fuse 22 disconnects the top contact 20 from the bottom connector 26.

Figure 2:
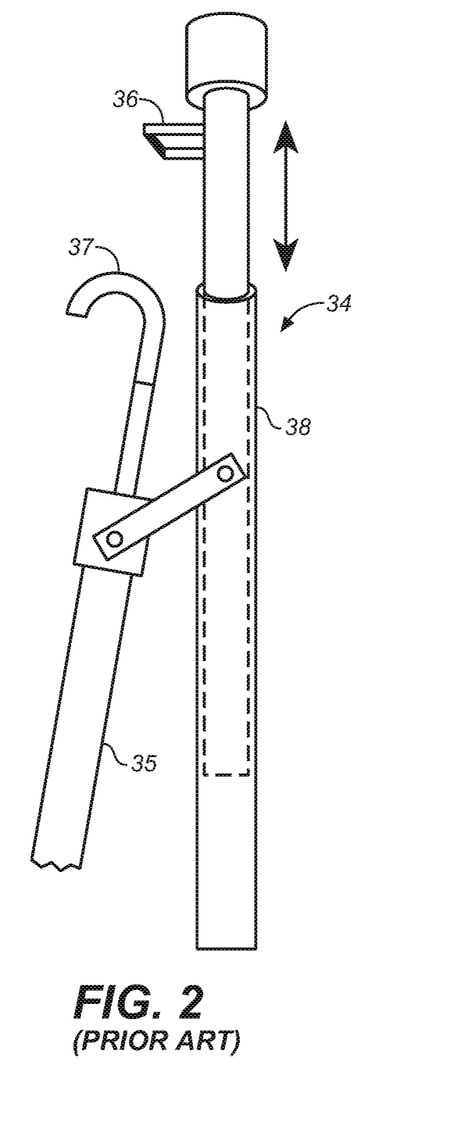
FIG. 2 illustrates a conventional loadbreak tool for operating a conventional cutout.

A metal hook assembly 28 is fixed to the connector 18 and is used to temporarily support a loadbreak tool for opening the fuse 22 (described with respect to FIG. 2). The bent hook assembly 28 is better shown in FIG. 6. A metal pull ring 30 is physically and electrically connected to the upper end of the fuse 22.

FIG. 2 is a simplified illustration of a portion of a conventional loadbreak tool 34, such as the Loadbuster™ by S&C Electric Company, that is used by linemen to open the fuse 22 while the wire 16 is energized. A description of the well-known Loadbuster™ is found at the web address http://www.sandc.com/en/products--services/products/load-buster-tool/ and is incorporated herein by reference. A long dielectric pole 35 is affixed to the bottom portion of the loadbreak tool 34 for manipulating the loadbreak tool 34 by the lineman. The diagram of the loadbreak tool 34 is intended to illustrate any loadbreak tool or hotstick used by a lineman that allows the lineman to open and close the fuse 22 while the wire 16 is energized. The loadbreak tool 34 is formed of a dielectric material with two metal hooks that engage the cutout 10, as described below, to allow the lineman to open and close the fuse 22 at a distance to avoid arcing.

The loadbreak tool 34 is positioned by a lineman, while the wire 16 is energized, so that an opening in a metal upper hook 36 of the loadbreak tool 34 is physically and electrically engaged with the metal hook assembly 28 of the cutout 10. Another metal hook 37 at the end of the pole 35 is physically and electrically engaged with the metal pull ring 30, electrically connected to the top of the fuse 22. The metal hook 37 is electrically connected to a loadbreak mechanism internal to the loadbreak tool 34. When the lineman pulls down on the pole 35, the slidable portion 38 is also pulled down. When the pole 35 and slidable portion 38 are pulled down by the lineman, the fuse 22 is pulled away from the top contact 20, and the loadbreak tool 34 creates a parallel circuit (internal to the loadbreak tool 34) that prevents arcing while the fuse 22 is being pulled down. Once the fuse 22 is pulled down a certain distance, a spring in the loadbreak tool 34 rapidly separates contacts within the loadbreak tool 34 to prevent arcing. The loadbreak tool 34 is then removed, and there is an open circuit between the wire 16 and the bottom connector 26.

In a simpler version, the loadbreak tool is simply a stick with a hook that engages the pull ring 30 to allow the linemen to open the fuse 22 when the wire 16 is energized.

FIGS. 3 and 4 illustrate a dielectric cover 44 previously invented by the Applicant. FIG. 4 shows the cutout 10 mounted to a wooden utility pole 46. The cutout 10 may instead be mounting on a wooden cross-arm of the utility pole 46. The pull ring 30 always faces away from the pole or cross-arm. The cover 44 also represents a similar design of other commercially available cutout covers that have a slot 46 in the back for placing the cover 44 over the cutout 10, and removing the cover 44 from the cutout 10, while the energized wire 16 is connected. In some covers, the slot may resiliently close after the wire 16 passes through. The cover 44 covers the entire cutout 10, including surrounding the metal hook assembly 28 and the pull ring 30 on their lateral sides. A flared-out portion of the cover 44 is intended to allow easy access to the hook assembly 28 and pull ring 30 by the loadbreak tool 34. However, it has been reported by linemen that, at certain wide angles, such as greater than about 20-30 degrees relative to vertical, the sidewalls of the flared portion of the cover 44 prevent the loadbreak tool 34 from hooking onto the hook assembly 28 and the pull ring 30. Sometimes, access to the cutout 10 or positioning by the lineman relative to the cutout 10 is limited, and the lineman needs to position the loadbreak tool 34, relative to the cutout 10, at a wider variety of engagement angles.

Simply widening the flared portion of the cover 44 would allow access over a wider range of angles, but wind forces on the open areas of the cover 44 would greatly increase and may result in the cover 44 being blown off or damaged. Additionally, widening the flared portion would invite animals, such as squirrels and birds, to nest in the wider opening, increasing the chances of a short to ground. It has been brought to the Applicant's attention that squirrels sometimes completely fill the flared opening with acorns.

Hubbell Power Systems, Inc. offers a cutout cover model CC101 that snaps over the insulator and provides a rounded shroud roof over the pull ring 30 and hook assembly 28. A website address for the cover is https://www.reynoldsonline.com/ASSETS/DOCUMENTS/ITEMS/EN/HUPOGS560_Spec.pdf. One problem with such a design is that the top of the loadbreak tool 34 must get under the rounded shroud roof and may hit the inner or outer opposing walls of the rounded shroud when manipulating the loadbreak tool 34. This limits the angles that the lineman may position the loadbreak tool 34 relative to the cutout. Further, since the Hubbell cover is secured in place by resiliently snapping it into place over the insulator, the size of the cover must be precisely tailored to a particular type of insulator. Further, it is difficult to remove the cover using a hotstick. Still further, since the Hubbell cover overlaps the top skirt of the insulator, contamination and moisture on the cover may cause a leakage current to flow across the surface of the cover, reducing the effective insulation.

What is needed is an improved cutout cover that enables a lineman to engage the cutout with a conventional loadbreak tool or hotstick over a wider range of angles, while the cover still provides an insulating barrier to energized parts.

SUMMARY

A fuse cutout cover is disclosed that allows a lineman to engage the cutout with a loadbreak tool over a wider range of angles, while the cover still protects wildlife from electrocution and causing a power outage.

In the new cover design, the sidewalls of the cover proximate to the pull ring and hook assembly of the cutout are eliminated or shortened to laterally expose the cutout's metal hook assembly and the fuse's pull ring. A roof portion of the cover extends over the hook assembly and pull ring. The roof portion may be substantially flat without any sidewalls in the vicinity of the hook assembly and pull ring.

Since the hook assembly and pull ring face away from the utility pole or cross-arm, a bird on the cross-arm cannot extend its wings to touch the hook assembly or the pull ring, so there is no disadvantage in exposing the sides of the hook assembly and the pull ring. In such a design, the lineman may even insert the loadbreak tool horizontally when engaging the cutout and operate the cutout properly. A practical range of angles for pulling down on the loadbreak tool is within 45 degrees relative to the vertical (90 degrees total) so that the lineman has adequate leverage to pull down the fuse.

The cover design, by eliminating the large flared opening with long sidewalls, also reduces the possibility of wildlife nesting in the cover (or squirrels storing acorns) since there is no wide opening in the cover having sidewalls. The design also reduces the wind pressure on the cover, and reduces ice and snow buildup. Also, since the volume of the cover is reduced, the cutout may be sold in its typical box with the cover over the cutout in the box. Further, since there is no flared portion of the cover, the three cutouts, one for each phase, can be placed closer together on a cross-arm without any portion of the covers being closer together.

The cover may be installed while the wire is energized since a vertical slot for the wire is provided along the back of the cover.

The cover may be held in place over the cutout by pins that extend through holes in the cover, where the pins are manipulated by the loadbreak tool or hotstick. A novel through-hole arrangement for the pins is also disclosed, which optimizes the pin placement for the cover when used with ceramic insulators and narrower polymer insulators.

Other features of the cover are also described.

BRIEF DESCRIPTION OF THE DRAWINGS

Elements labeled with the same numerals in the various figures may be identical or similar.

DETAILED DESCRIPTION

Figure 5:
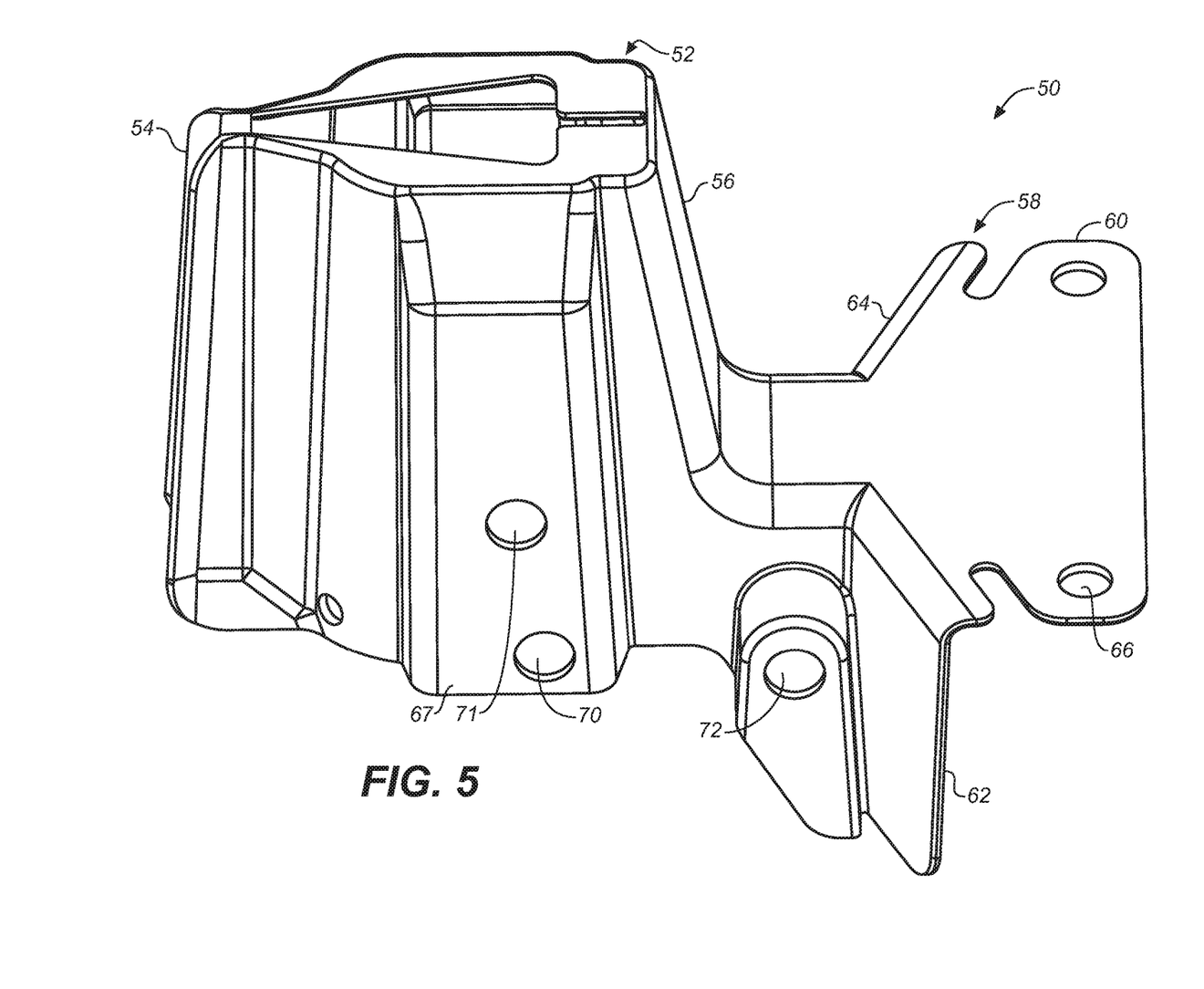
FIG. 5 is a perspective view of a cutout cover in accordance with one embodiment of the present invention, where there are no sidewalls near the end of the cover, and the roof over the hook assembly and pull ring is flat.
Figure 6:
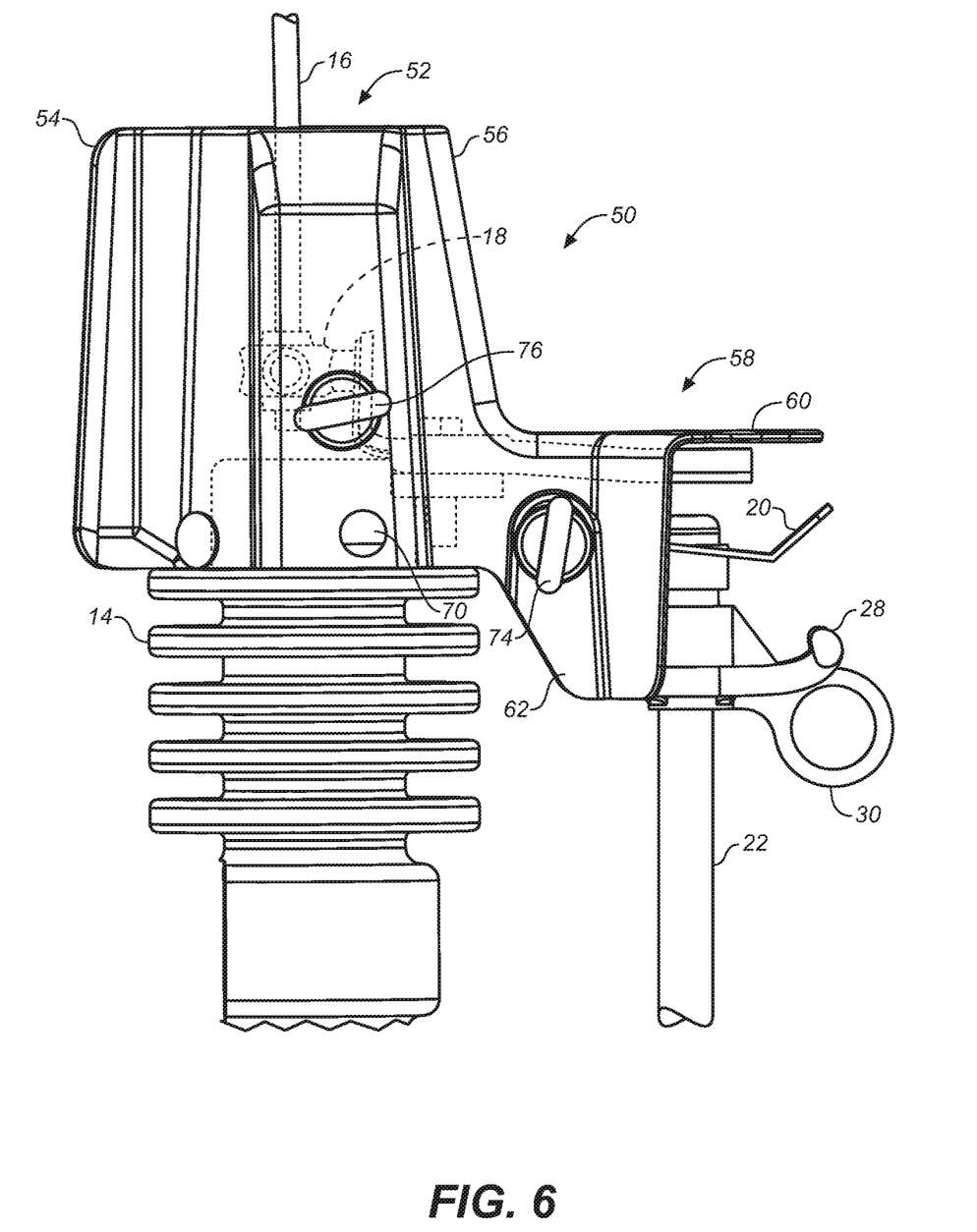
FIG. 6 is a side view of the cutout of FIG. 1 with a cutout cover of FIG. 5. The insulator is porcelain and relatively thick. Retaining pins are inserted through a first set of holes to keep the cover in place.
Figure 7:
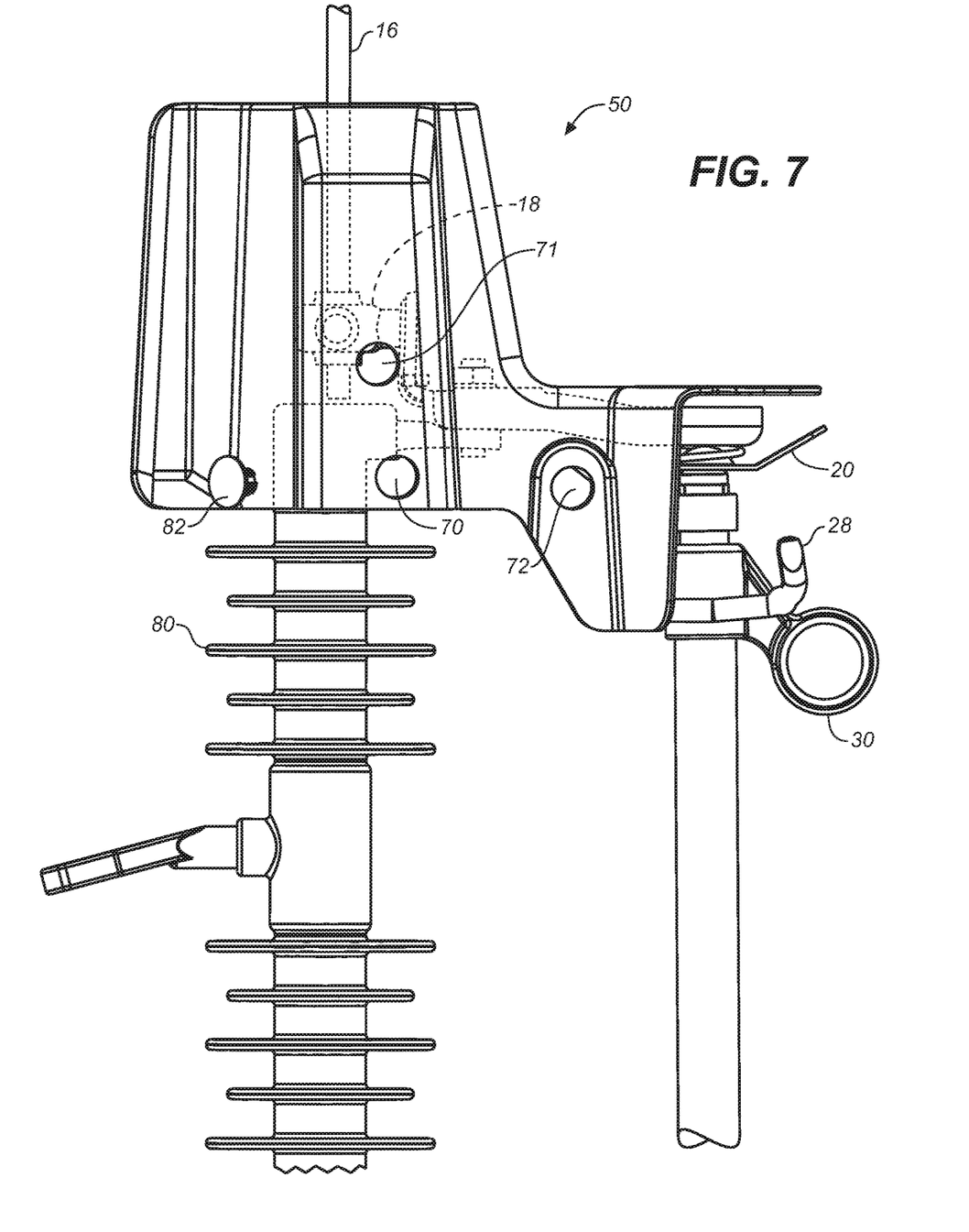
FIG. 7 illustrates the same cover as in FIG. 6 but over a narrower polymer insulator. Retaining pins are to be inserted through a second set of holes to keep the cover in place.

FIGS. 5-7 illustrate a cutout cover 50 in accordance with one embodiment of the invention. The cover 50 is a one-piece molded polymer.

A first portion 52 of the cover 50 includes a vertical slot 54 through which the energized wire 16 (FIG. 6) is inserted when installing the cover 50 over the cutout. The first portion 52 also covers the top of the insulator 14 (above the top skirt) to prevent wildlife from contacting the wire connector 18.

A second portion 56 of the cover 50 slopes down to a third portion 58 that includes a flat roof 60, which covers the top connector 20, hook assembly 28, and pull ring 30. The roof 60 is slightly wider than the top connector 20, hook assembly 28, and pull ring 30 to prevent birds alighting on the energized top connector 20, hook assembly 28, and pull ring 30.

The sidewalls 62 and 64 of the third portion 58 terminate before the end of the cover 50 in order to allow a loadbreak tool to enter from the side. The sidewalls 62 and 64 are flared out to block the hook assembly 28 from contact with any portion of a bird. The roof 60 is flat (rather than arched) so as not to restrict lateral movement of the loadbreak tool. No sidewall is laterally located next to the hook assembly 28 and pull ring 30 to allow maximum access by the loadbreak tool. The sidewalls 62 and 64 extend down to approximately the level of the hook assembly 28.

The front of the flat roof 60 includes holes 66 for grasping by a hot stick to position the cover 50 over the insulator 14.

The cover 50 has a first expanded portion 67 to accommodate the connector 18 for the wire 16 and the top portion of the insulator 14.

Figure 8:
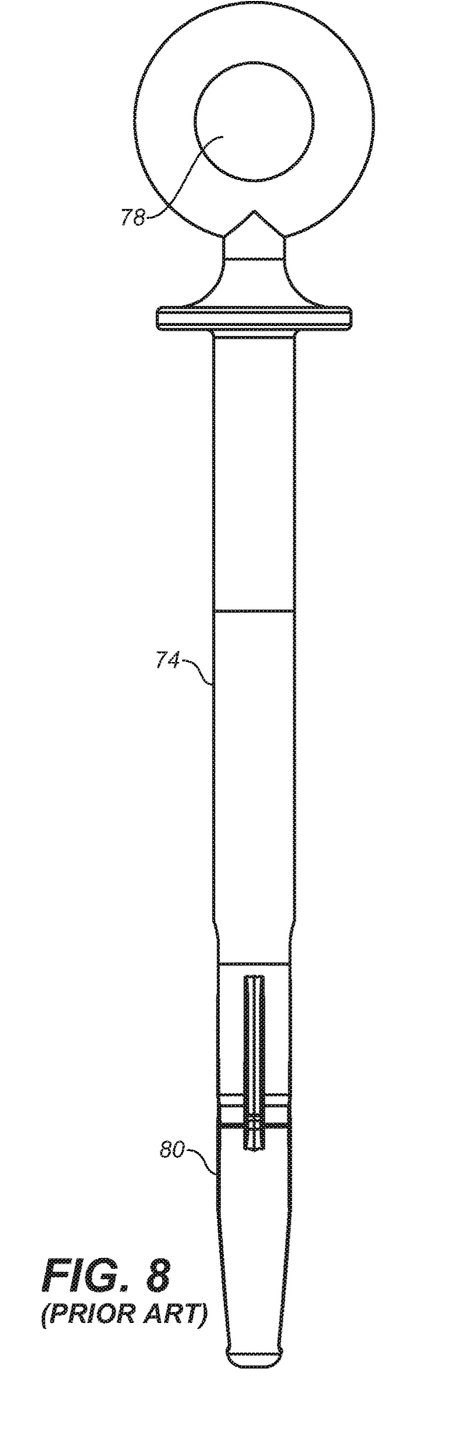
FIG. 8 is a front view and FIG. 9 is a side view of a pin used to secure the cover over the cutout.
Figure 9:
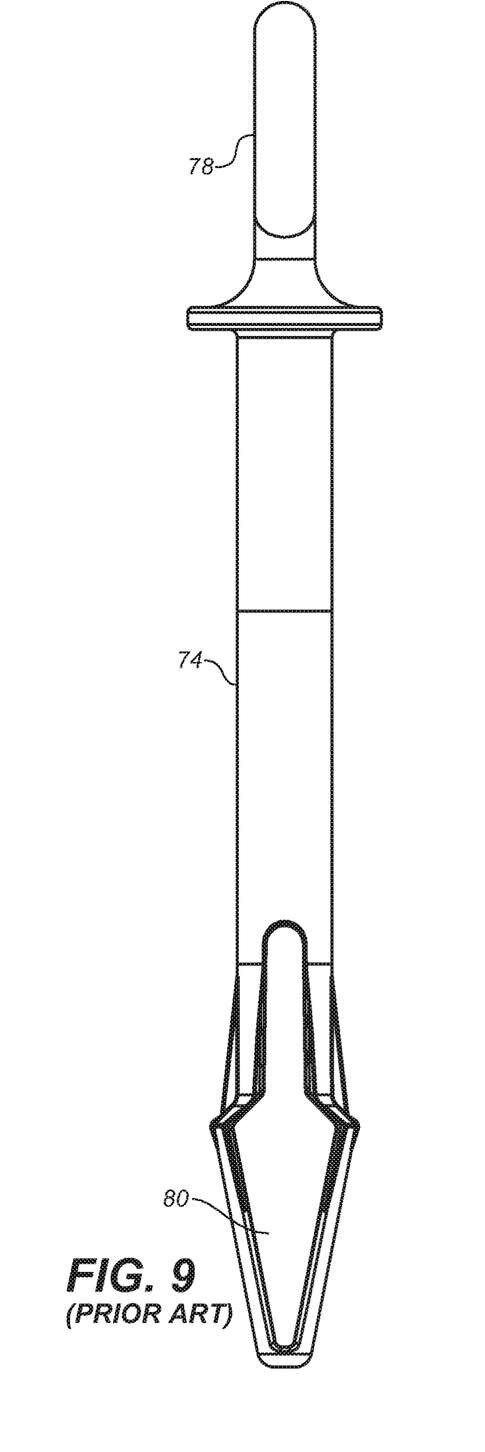

The cover 50 has through-holes 70, 71, and 72. In the example of a porcelain insulator 14, which is relatively thick and shown in FIG. 6, identical securing pins 74 and 76 (shown in more detail in FIGS. 8 and 9) are inserted, using a hotstick. The pin 74 is described in Applicant's U.S. Pat. No. 8,963,011, incorporated herein by reference. The pin 74 has a ring 78 (FIG. 8) that engages a hook on a hotstick. At the other end of the pin 74 is a resilient portion 80 with a narrow tip that expands outward at about a 15 degree angle. The resilient portion 80 allows the pin 74 to be inserted easily through the holes by the hotstick, but the top of the resilient portion 80 has a 45 degree angle, which makes it much more difficult to remove the pin 74. A cross-section of the body of the pin 74 is slightly oval. The pins 74 and 76 extend below the metal connector 18 and the top contact 20 so the cover 50 does not blow off in high winds.

In a preferred embodiment, the cover 50 is made only slightly wider than the cutout 10 so as to not take up excess space. This allows the cutout 10 and cover 50 to be sold in the same box that is typically used just for cutouts 10.

The areas with the through-holes are stepped out from the remainder of the cover 50 to compensate for the reduced insulating properties as a result of the hole. Modeling of the design shows that the stepped out distance offsets the effect of the hole so the insulating properties of the cover are fairly consistent over the cover 50.

Once the cover 50 is installed, a bird on the cross-arm of the utility pole cannot contact the laterally-exposed energized metal of the cutout 10 since the opening in the cover 50 is facing away from the cross-arm. Since there is very little open space in the cover 50, wildlife cannot nest in the opening and squirrels cannot store nuts in the opening.

Importantly, the conventional loadbreak tool 34 of FIG. 2 can engage the hook assembly 28 and pull ring 30 over a wide range of angles, up to 180 degrees, without the sidewalls 62 and 64 of the cover 50 interfering with the loadbreak tool 34. In the preferred embodiment, the loadbreak tool 34 can simultaneous engage the hook assembly 28 and the pull ring 30 on either side of the cover 50, for operating the cutout, when the angle of the loadbreak tool 34 is anywhere from 0-45 degrees from vertical (90 degree range total). This range of angles gives the lineman adequate leverage to pull down on the loadbreak tool 34 to open up the fuse. The insertion angle range of the loadbreak tool 34 may be higher, such as up to 90 degrees from the vertical, but a range greater than 45 degrees from vertical is typically not needed in the field.

In all embodiments, additional holes may be formed in the cover 50 for receiving a hotstick tool that handles the cover 50 from a safe distance so the lineman can position the cover 50 over the cutout 10 when energized. Alternately, the holes used for the pins 74 and 76 may be used to position the cover 50 using a hotstick.

Note that, in FIG. 6, the bottom hole 70 is blocked by the thick porcelain insulator 14, so a pin 74 cannot be inserted through the hole 70.

FIG. 7 illustrates the same cover 50 shown in FIG. 6, but the cover 50 is installed over a thinner polymer insulator 80. In this case, the bottom hole 70 is not obstructed by the insulator 80, and a pin 74 can be inserted through the hole 70 to keep the cover 50 in place. Any of the holes 70-72 may be used to keep the cover 50 in place. The different combinations of through-holes for the different types of insulators optimize the securing of the cover to the cutout for the different types of insulators so only one cover design is needed.

Note that the cover 50 does not extend beyond the pull ring 30 of the cutout 10 to allow maximum access to the cutout 10.

A plastic rivet 82 is inserted at the factory and is used to prevent the cover 50 from sliding over the top skirt of an insulator.

Figure 10:
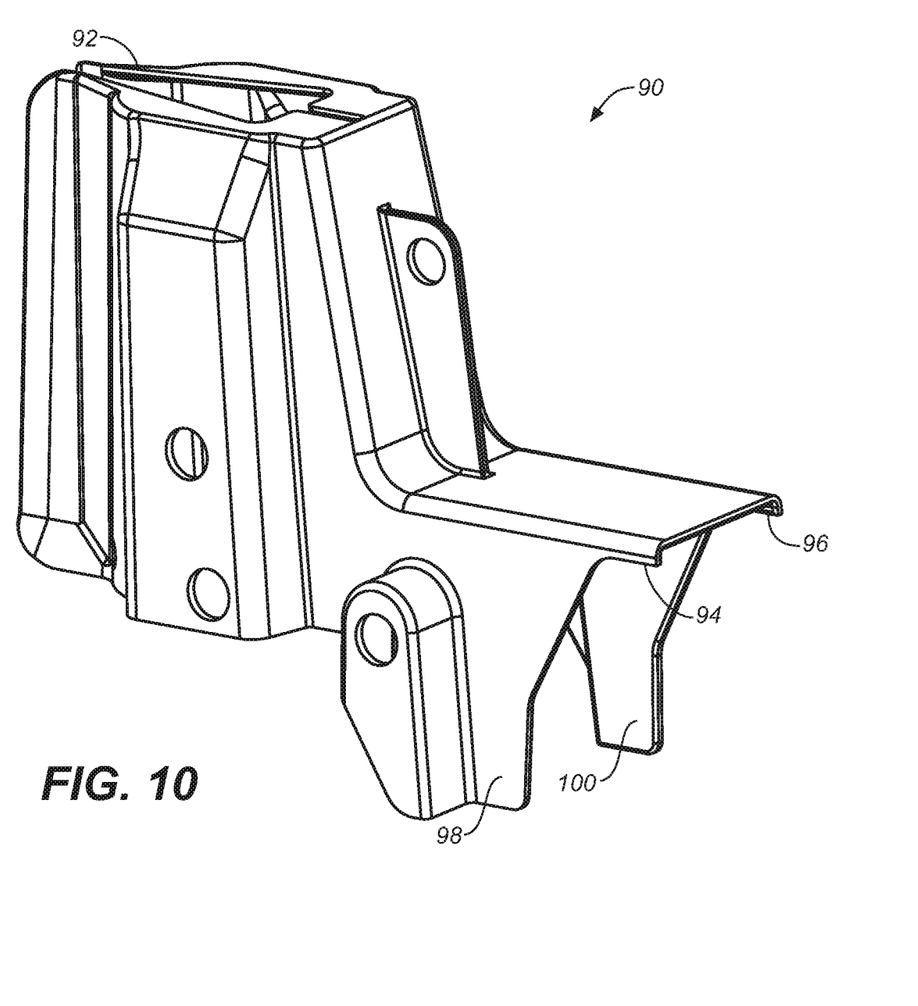
FIG. 10 is a perspective view of another embodiment of a cutout cover having shortened sidewalls at the end of the cover.

FIG. 10 illustrates another embodiment of a cutout cover 90. The cover 90 is a single piece and has a vertical slot 92 for receiving an energized wire 16 when installing the cover 90 over a cutout. The cover 90 is similar to the cover 50 but has short sidewalls 94 and 96 near the front that do not interfere with the insertion or removal of a loadbreak tool. The longer sidewalls 98 and 100 near the rear do not laterally block a loadbreak tool from engaging the hook assembly 28 or the pull ring 30.

Figure 11:
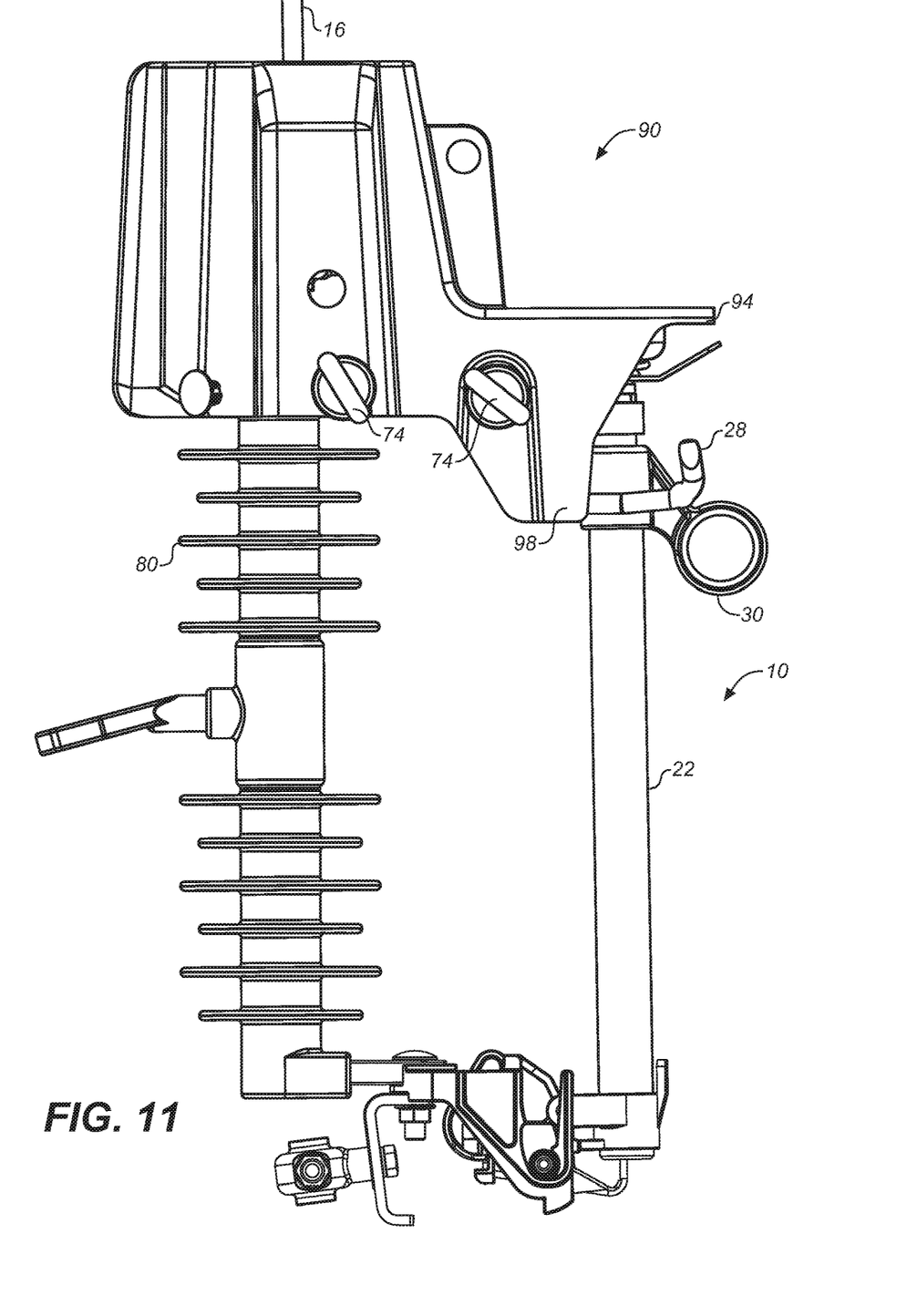
FIG. 11 is a side view of a cutout with the cover of FIG. 10 secured over it.

FIG. 11 illustrates the cover 90 installed over a cutout 10 and insulator 80. Pins 74 extend through holes in the cover 90 to keep the cover 90 in place.

The top connector 20 (FIG. 1) of the cutout 10 is surrounded by the sidewalls 98 and 100. The sidewalls 98 and 100 extend below the horizontal level of the hook assembly 28 and pull ring 30. Since the sidewalls 94 and 96 are very short in the area above the pull ring 30, there is less chance of a loadbreak tool getting blocked by the sidewalls 98 and 100, in contrast to the Hubble cover model CC101 design, which has a fairly deep arched shroud over the hook assembly 28 and pull ring 30.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A dielectric cover for a fuse cutout, the fuse cutout comprising an insulator, a first connector supported by the insulator for a wire carrying a voltage, a metal hook assembly fixed to a top portion of the cutout and electrically contacting the first connector, and a metal pull ring fixed to a top portion of a fuse, wherein the hook assembly and pull ring are configured to be simultaneously engaged by a loadbreak tool for physically and electrically disengaging the top portion of the fuse from the hook assembly when the loadbreak tool is pulled generally downward by a lineman, the cover comprising:
 a first portion configured for at least covering the first connector and having a vertical opening for receiving the wire;
 a second portion extending from the first portion, the second portion having a substantially flat roof portion configured for covering the hook assembly and the pull ring,
 wherein the cover is configured such that the hook assembly and pull ring are laterally exposed, when the cover is installed over the fuse cutout, to allow the loadbreak tool to engage the hook assembly and pull ring at a wide range of angles,
 wherein the cover is configured to be positioned over at least a first type of fuse cutout and a different second type of fuse cutout; and
 at least one pin inserted through one or more of at least three through-holes in the cover for preventing the cover from being blown off the fuse cutout, the at least one pin being configured to allow the at least one pin to be inserted and removed by a lineman using a hotstick,
 wherein, when the cover is positioned over the first type of fuse cutout, the at least three through-holes includes one or more first holes that are blocked by the first type of fuse cutout, and wherein the at least one pin is inserted through unblocked one or more second holes for preventing the cover from being blown off the fuse cutout, and
 wherein, when the cover is positioned over the second type of fuse cutout, the second type of fuse cutout does not block the one or more first holes, and the at least one pin is inserted through the one or more first holes for preventing the cover from being blown off the fuse cutout.

2. The cover of claim 1 further comprising sidewalls extending from the second portion, wherein the sidewalls terminate so as to laterally expose the hook assembly and pull ring.

3. The cover of claim 1 wherein the substantially flat roof portion is configured to overlie at least portions of the hook assembly and the pull ring, and wherein there are no sidewalls extending down from the roof portion that overlies the pull ring.

4. The cover of claim 1 wherein the cover allows a lineman to engage the hook assembly and pull ring with the loadbreak tool while the loadbreak tool has an angle at least 45 degrees relative to vertical.

5. The cover of claim 1 further comprising expanded side portions at least for accommodating an upper portion of the insulator.

6. The cover of claim 1 further comprising sidewalls extending from the second portion that flare out while laterally exposing the hook assembly and pull ring.

7. The cover of claim 1 further comprising sidewalls extending from the second portion, wherein the sidewalls extend below a horizontal level of the hook assembly and pull ring while laterally exposing the hook assembly and pull ring.

8. The cover of claim 1 wherein the cover is a one-piece molded unit.

9. The cover of claim 1 wherein the cover is installed over the fuse cutout.

10. The cover of claim 1 wherein the insulator has a top skirt, and wherein the cover is narrower than the top skirt so as to not surround the top skirt.

11. A fuse cutout dielectric cover, the fuse cutout comprising an insulator, a first connector supported by the insulator for a wire carrying a voltage, a metal hook assembly fixed to a top portion of the fuse cutout and electrically contacting the first connector, and a metal pull ring fixed to a top portion of a fuse, wherein the hook assembly and pull ring are configured to be simultaneously engaged by a loadbreak tool for physically and electrically disengaging the top portion of the fuse from the hook assembly when the loadbreak tool is pulled generally downward by a lineman, the cover covering the first connector and at least partially covering the hook assembly and the pull ring, the cover comprising:

at least one pin inserted through one or more of at least three through-holes in the cover for preventing the cover from being blown off the fuse cutout, the at least one pin being configured to allow the at least one pin to be inserted and removed by a lineman using a hotstick, wherein the cover is configured to be positioned over at least a first type of fuse cutout and a different second type of fuse cutout; and wherein, when the cover is positioned over the first type of fuse cutout, the at least three through-holes includes one or more first holes that are blocked by the first type of fuse cutout, and wherein the at least one pin is inserted through unblocked one or more second holes for preventing the cover from being blown off the fuse cutout, and wherein, when the cover is positioned over the second type of fuse cutout, the second type of fuse cutout does not block the one or more first holes, and the at least one pin is inserted through the one or more first holes for preventing the cover from being blown off the fuse cutout.

12. A method for installing a fuse cutout cover over a fuse cutout comprising:

installing the cover over a first type of fuse cutout, the cover having a first combination of through-holes for receiving pins to secure the cover over the first type of fuse cutout, the cover also having a second combination of through-holes, different from the first combination of through-holes, for receiving the pins to secure the cover over a second type of fuse cutout, wherein one or more of the through-holes in the first combination of through-holes are blocked by the second type of insulator; and selecting, by a lineman, to insert the pins through the first combination of through-holes, rather than the second combination of through-holes, to secure the cover over the first type of fuse cutout, wherein the pins are configured to be inserted and removed by the lineman using a hotstick.

13. The method of claim 12 wherein the first type of fuse cutout includes a porcelain insulator, and the second type of fuse cutout includes a narrower polymer insulator.

14. The method of claim 13 wherein at least one of the pins extends below a connector for a wire.

15. A cutout cover system for being installed over a fuse cutout comprising:

a dielectric cover configured for being installed over either one of a first type of fuse cutout or a second type of fuse cutout, the cover having a first combination of through-holes for receiving pins to secure the cover over the first type of fuse cutout, the cover also having a second combination of through-holes, different from the first combination of through-holes, for receiving the pins to secure the cover over the second type of fuse cutout, wherein one or more of the through-holes in the first combination of through-holes is blocked by the second type of insulator; and the pins being configured for inserting through the first combination of through-holes to secure the cover over the first type of fuse cutout or for inserting through the second combination of through-holes to secure the cover over the second type of fuse cutout, wherein the pins are configured to be inserted and removed by a lineman using a hotstick.

16. The system of claim 15 wherein the first type of insulator fuse cutout includes a porcelain insulator, and the second type of fuse cutout includes a narrower polymer insulator.

17. The system of claim 15 wherein at least one of the pins extends below a connector for a wire.

* * * * *